March 7, 1967  G. C. NEWTON, JR  3,307,409
METHOD OF AND APPARATUS FOR MEASURING ANGULAR MOTION
Filed Feb. 26, 1959  7 Sheets-Sheet 1

INVENTOR.
GEORGE C. NEWTON, JR.
BY Rines and Rines
ATTORNEYS

March 7, 1967 G. C. NEWTON, JR 3,307,409
METHOD OF AND APPARATUS FOR MEASURING ANGULAR MOTION
Filed Feb. 26, 1959 7 Sheets-Sheet 2

INVENTOR.
George C. Newton, Jr
BY Rines and Rines
ATTORNEYS

March 7, 1967  G. C. NEWTON, JR  3,307,409
METHOD OF AND APPARATUS FOR MEASURING ANGULAR MOTION
Filed Feb. 26, 1959  7 Sheets-Sheet 3

INVENTOR.
GEORGE C. NEWTON, JR.
BY *Rines and Rines*

ATTORNEYS

March 7, 1967 G. C. NEWTON, JR 3,307,409
METHOD OF AND APPARATUS FOR MEASURING ANGULAR MOTION
Filed Feb. 26, 1959 7 Sheets-Sheet 4

INVENTOR.
GEORGE C. NEWTON, JR.
BY Rines and Rines
ATTORNEYS

March 7, 1967     G. C. NEWTON, JR     3,307,409
METHOD OF AND APPARATUS FOR MEASURING ANGULAR MOTION
Filed Feb. 26, 1959     7 Sheets-Sheet 5

INVENTOR.
GEORGE C. NEWTON, JR.
BY Rines and Rines
ATTORNEYS

March 7, 1967  G. C. NEWTON, JR  3,307,409
METHOD OF AND APPARATUS FOR MEASURING ANGULAR MOTION
Filed Feb. 26, 1959  7 Sheets-Sheet 7

INVENTOR.
GEORGE C. NEWTON, JR.
BY Rines and Rines
ATTORNEYS

United States Patent Office 3,307,409
Patented Mar. 7, 1967

3,307,409
METHOD OF AND APPARATUS FOR
MEASURING ANGULAR MOTION
George C. Newton, Jr., 21 Aberdeen Road,
Wellesley, Mass. 02181
Filed Feb. 26, 1959, Ser. No. 795,671
24 Claims. (Cl. 73—505)

The present invention relates to methods of and apparatus for measuring angular motion, and, more particularly, angular-motion transducer apparatus.

Numerous types of instruments have been evolved for measuring angular motion with respect to inertial space. The gyroscope, for example, measures such angular motion through the torque reaction resulting from its rotating wheel. Other types of angular motion-responsive apparatus have included vibrating rods or wires secured at one or both ends; sometimes, in the form of tuning forks and the like. Such forks, for example, have been mounted for free turning about a central axis extending parallel to the fork arms, being adapted to carry an angle indicator together with a means for vibrating the arms, whereby the arms may vibrate in a fixed plane even though the housing of the instrument be rotated.

All such prior-art angular motion-measuring instruments, however, are subject to numerous disadvantageous features that it is an object of the present invention to overcome. The gyroscope, for example, requires rotating wheels and the like, which it would be advantageous to eliminate. This end is achieved, in accordance with the present invention, through the utilization of standing or traveling elastic waves, sonic or ultrasonic, in elastic-wave-supporting media of particular configuration. Two sets of elastic waves are used; one, termed a driving wave, imparts velocities to the mass elements that comprise the medium; and the second wave, termed a sensing wave, detects angular motion of the medium. The medium thus supports two distinct and separate waves that are so arranged that the cross-coupling between them is a function, at least in part, of the angular velocity of the medium as a whole with respect to inertial space.

Another object of the present invention is to provide a new and improved method of measuring angular motion with respect to inertial space, as represented by, for example, angular velocity or angular displacement.

A further object is to provide a new and improved angular motion transducer for transducing such motions into electrical signals.

While all angular motion-measuring instruments, including conventional gyroscopes and the like, operate upon the principles of detecting Coriolis forces, prior-art gyroscopic apparatus is subject to the further disadvantage of being unable to discriminate between Coriolis forces and forces resulting from the shifting of the center of gravity of the apparatus. In accordance with the present invention, however, there is provided inherent distinguishment between angular motion-induced forces from such static forces as those caused by gravity or acceleration. Differentiation between the desired angular motion-induced forces and other dynamic forces acting upon the transducer is also provided.

A further object, still, is to provide a novel transducer that attains high sensitivity and special dynamic effects through the use of low-loss standing waves for sensing angular motion.

Other and further objects will be explained hereinafter, and will be more particularly pointed out in connection with the appended claims.

The invention will now be described with relation to the accompanying drawing, FIG. 1 of which is a combined block diagram and longitudinal section of transducer apparatus operating in accordance with the present invention;

FIG. 2 is an explanatory diagram illustrating the transducer medium in perspective form, and explaining the directions of velocities and forces associated therewith;

Figures 1, 2:
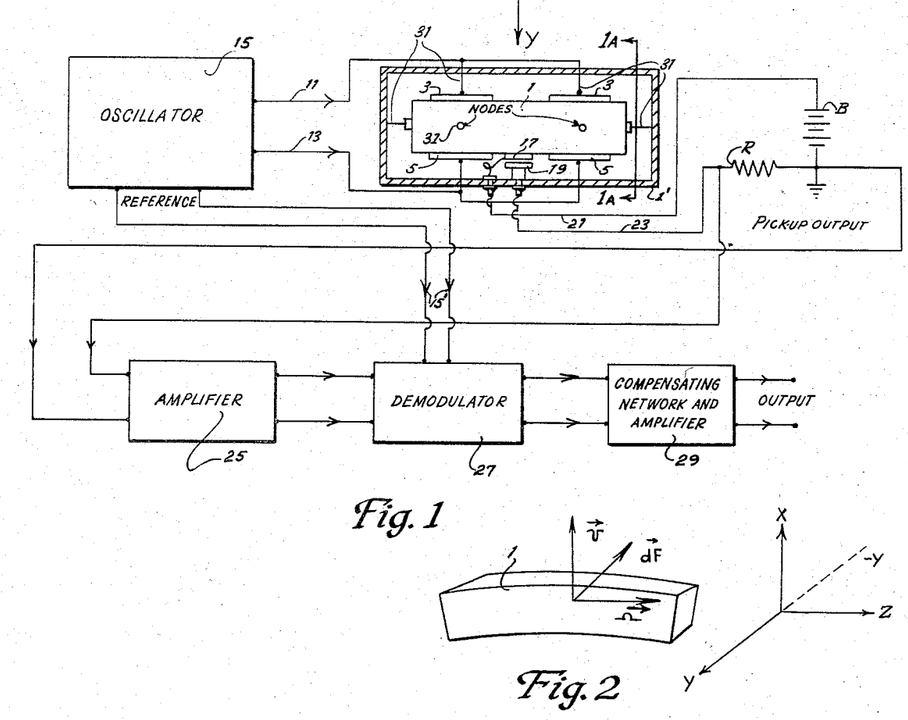

As before stated, the present invention embodies a transducer incorporating a medium 1, shown as of bar- or rod-like form in FIG. 1, for internally supporting elastic waves, as distinguished from macroscopic vibrational movements of the medium. The bar could be constituted of piezoelectric material, such as quartz; or it may be of other materials, later discussed. A driving elastic wave imparts local motions to the elemental particles comprising the medium, and may be of the extensional, flexural, shear, torsional, or tensional types. Consider, for example, the elastic displacement of the medium 1 in the X-direction, FIG. 2. When the medium 1, as a whole, rotates with respect to inertial space, say with an angular velocity $\Omega$ along the Z-axis, FIG. 2, the individual elements thereof will experience a Coriolis force $dF$ along a direction, illustrated by the Y-axis, normal or orthogonal to the local elastic-wave velocity V in the medium 1, and normal or orthogonal, also, to the angular velocity vector $\Omega$ of the medium.

Through appropriate design of the transducer apparatus, the integrated effect of such Coriolis forces acting upon the individual elements constituting the transducer medium 1, may be caused to increase or decrease the actual energy of the sensing elastic wave also resulting in the medium. It is in this manner, that the amplitude of the sensing wave, representative of the effect of the Coriolis forces, is a function of the angular motion of the medium with respect to inertial space. Mathematically, the Coriolis force $d\vec{F}$, acting upon each element of the wave-supporting elastic medium 1 of mass $dM$, is determined by the vector product $2dM\vec{V}\times\vec{\Omega}$.

The angular-motion transducer, as before stated, may employ elastic waves of various classes. The driving and sensing waves, as an illustration, may both be flexural, as hereinafter more fully discussed in connection with the embodiment of FIG. 1. The trasducer may, on the other hand, employ extensional waves for driving, and flexural waves for sensing; or vice versa. Any combination of driving and sensing elastic waves, of the same type, or of different types, may also be employed, as desired.

Figure 1A:
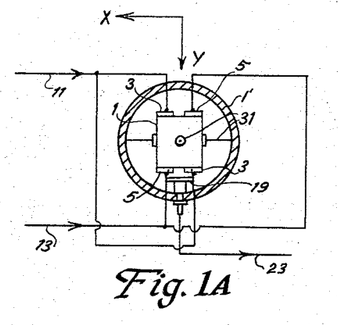
FIG. 1A is a transverse section taken along the line 1A—1A of FIG. 1, looking in the direction of the arrows.

The bar, or other medium, 1 of FIGS. 1 and 1A is shown provided with two longitudinally spaced sets of adjacent transversely spaced pairs of electrodes 3, 5. The electrodes 3 and 5 of each pair are reversely positioned as more particularly shown in FIG. 1A; and they are connected by conductors 11 and 13 to an oscillator 15, or other source of alternating-current energy. Alternating-current voltage will then be applied theerbetween, setting up a standing elastic wave in the medium 1 which, in this particular case, may flex the bar 1 in the X–Z plane, as more particularly shown by the elastic displacement illustrated in FIG. 2. The driving wave will thus be referred to as an X-wave. The bar is shown supported by strut supports 31 at its ends and sides, within a capsule or housing 1' as of conducting or insulating material. The upper and lower strut supports 31 electrically connect with conductors 11 and 13, before mentioned.

In the illustrated example, the bar 1 has a longitudinal dimension so adjusted relative to the frequency of the elastic waves set up by the alternating-current voltage, that two nodes are produced in the plane of the supports 31 connected to the pairs of electrodes 3, 5. The longitudinal dimension of the bar 1 is thus at least comparable to the wavelength corresponding to the said elastic-wave frequency that would occur in a bar of infinite longitudinal dimension. The required length of the bar 1 for the purpose of supporting the said two-node wave is approximately three-quarters of the elastic wavelength that would be set up in a bar of infinite length. The bar 1, of course, may be longer than the said wavelength. For this support positioning with the particular frequency elastic waves, moreover, the waves will exert substantially no wave-frequency-produced force upon the supporting means 31.

As a result of the elemental particle velocities in the X-direction thereby set up, and any angular velocity along the Z-axis effected during the operation of the instrument, Coriolis forces will exist in the Y-direction. These forces will give rise to the Y-direction elastic waves, also having two nodes in the medium 1; and this wave, Y-direction wave, is sensed, in accordance with the present invention, by a pick-up member shown as of the variable capacitance type comprising a first electrode disposed preferably centrally upon the bar at 17, and a capacitively coupled electrode 19 cooperative therewith. The pick-up device 17, 19 that senses the Y-wave is shown, in turn, connected by conductors 21 and 23 to a load comprising the resistor R, connected in circuit with a source of energy, shown as a battery B. The voltage developed across the resistor R is applied to an amplifier 25 and to a demodulator 27. The demodulator 27 is supplied with a reference signal from the oscillator 15 by means of conductors 15', in order to detect the phase of the picked-up signal. The output of the demodulator 27 may be fed through a compensating network, 29, with or without further amplification, for improving the dynamic response of the system, or for providing a signal of desired functional relationship to angular motion, thereby to produce an output signal that may be employed as a measure of the angular motion around or about the Z-axis.

Figure 3:
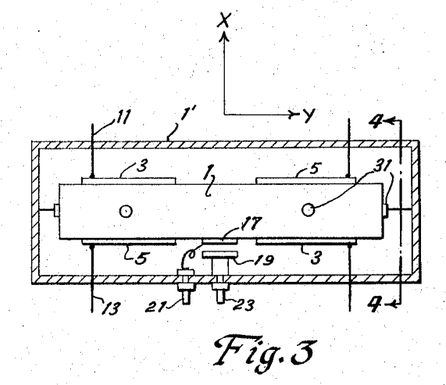
FIG. 3 is a longitudinal section of a transducer similar to that illustrated in FIGS. 1 and 1A, but driven in accordance wth extensional elastic waves.
Figure 4:
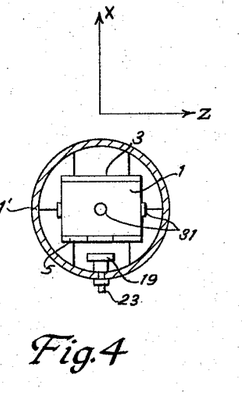
FIG. 4 is a transverse section, taken upon the line 4—4 of FIG. 3, looking in the direction of the arrows.
Figure 5:
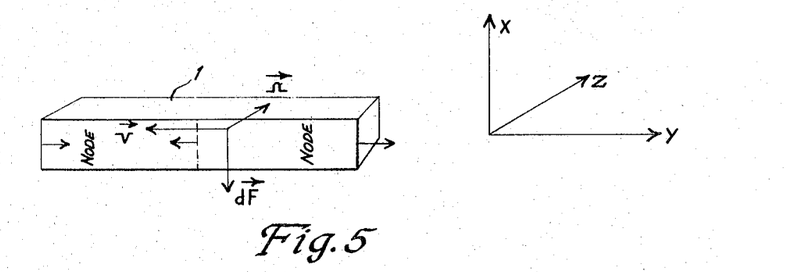
FIG. 5 is a view similar to FIG. 2 illustrating the driving-wave forces and velocities in the medium of FIGS. 3 and 4.
Figure 6:
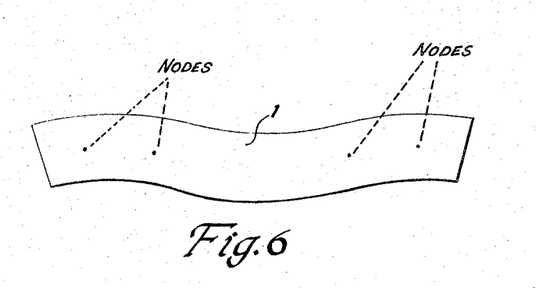
FIG. 6 is a schematic diagram of the transducer medium under flexure caused by induced Coriolis forces.

For purposes of illustrating the versatility of the invention, a transducer is illustrated in FIG. 3, on the other hand, which is also of the bar or rod type, but that employs a driving wave of the extensional variety. The bar or medium 1, as of piezoelectric material or the like, or of materials later discussed, is excited in this case so as to produce extensional waves along the Y-axis, which corresponds, also, to the longitudinal axis of the bar 1. Again, a two-node wave is employed, the regions of the nodes being illustrated, as in FIG. 1, by the circles between the sets of electrodes 3, 5. As in the case of the embodiment of FIG. 1, the bar 1 has a length bearing a definite relationship to the frequency of the driving elastic waves; the length being substantially comparable to or greater than the wavelength of the driving wave. As more particularly shown in FIG. 5, particles near the center of the bar 1 acquire a velocity V in the negative Y-direction. If, now, the bar 1 is subjected to an angular velocity around or about the Z-axis, the resulting Coriolis force acting on a particle is in the direction of the negative X-axis. By suitably dimensioning the bar 1, the natural frequency of a four-node flexural wave in the X–Y plane can be made equal to the frequency of the driving wave. The integrated effect of the Coriolis force, with the bar 1 so dimensioned, tends to excite a flexural wave of four nodes in the X–Y plane, as shown in FIG. 6. This wave may be sensed by the variable capacitance pick-up member 17, 19, as discussed in connection with the embodiment of FIG. 1.

The ultimate method of utilizing the output movements of the transducer of the present invention is not, of course, restricted merely to amplitude modulation of an electrical voltage signal. A variable capacity pick-up, for example, may modulate the frequency of an oscillator so as to produce a frequency-modulation signal, the modulation of which is related to the angular motion of the transducer about the Z-axis. Any type of telemetering or indicating manifestation of the output may similarly be employed, as is well known.

One of the advantages of the embodiment of FIG. 3 over the transducer of FIG. 1 resides in the fact that in the system of FIG. 3 it is possible to locate the sensing member 17, 19 in the vicinity of the node of the driving wave, thus tending to diminish cross-coupling effects not associated with the angular motion of the medium 1. Such a location for the sensing member 17, 19 would be below the node between electrodes 3, 5 of FIG. 3. In order to use this location, a hole, not shown, for receiving electrode 17 can be made in electrode 5, or, alternatively, electrodes 3 and 5 may be reduced in size and merely used as supports for the medium 1.

Figure 7:
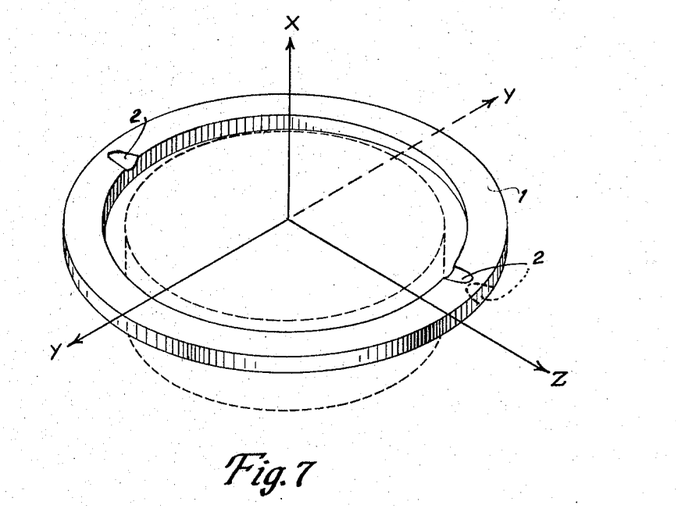
FIG. 7 is a perspective view of a transducer, constructed in accordance with a preferred embodiment of the invention, and illustrated in ring form.

While the transducers of FIGS. 1 and 3 are of finite length in the direction of the waves that create the standing waves employed in these systems, it is deemed preferable, in accordance with the present invention, to employ a medium having, in effect, an infinite dimension. This is achieved in accordance with the present invention without the necessity for making the dimension of the medium actually very large. Specifically, the forming of the medium into a substantially planar ring 1, as illustrated in FIG. 7, can serve this purpose. The advantage of such a closed medium 1 is severalfold. First, end effects inherent in the structures of FIGS. 1 and 3 are eliminated. If either flexural or extensional waves are employed, losses are reduced. In the case of flexural waves, moreover, the nodal spacing takes on a uniform pattern. In addition, the dimensions of the transducer for a particular frequency of alternating-current driving energy may be made smaller.

Figure 8:
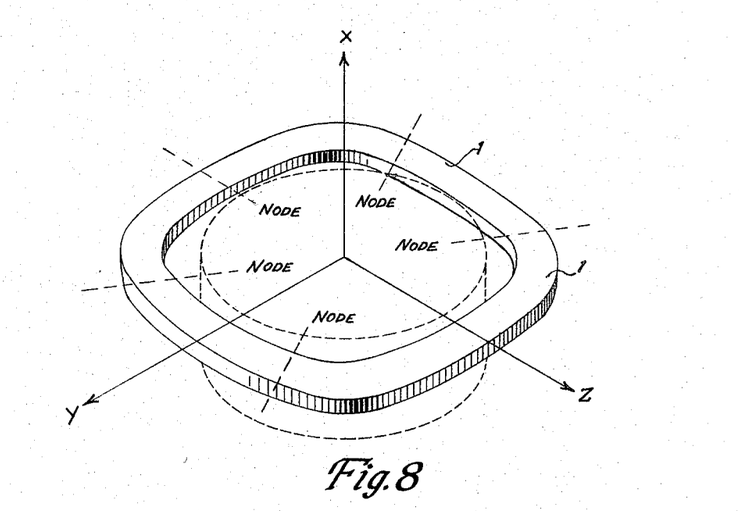
FIG. 8 is a view similar to FIG. 7, illustrating the ring deformed standing X-wave elastic vibrations.

While the ring 1 of FIG. 7 may support many kinds of elastic waves, the particular waves of interest, for the purposes of the present invention, are of the flexural type. If the ring bends so as to displace its elements in the X-direction, normal to the plane of the ring 1, the wave, as before mentioned, is defined as an X-wave; and a wave is illustrated in FIG. 8, having six nodes equally spaced along the ring. The rings of FIGS. 7 and 8 are shown disposed about a cylinder which is employed for reference purposes in order to illustrate the physical deformations of the ring.

Figure 9:
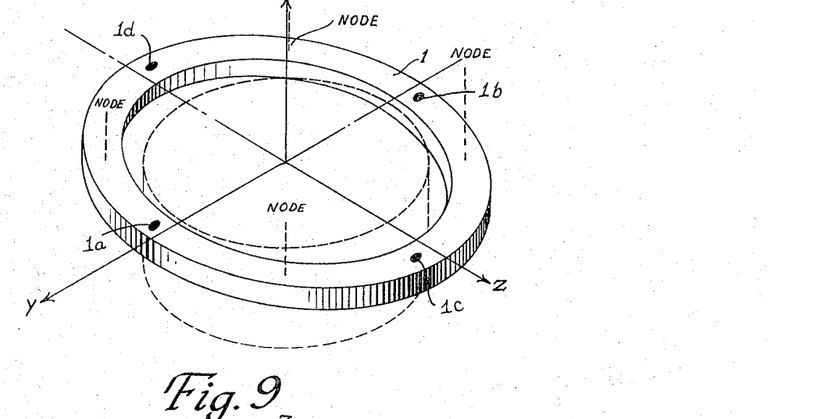
FIG. 9 is a view similar to FIG. 8, illustrating the displacement of the ring in accordance with P-wave elastic vibrations.

The ring 1 can also, of course, support the beforementioned Coriolis-force-produced wave, herein termed a P-wave, representative of radial motion of the elements, as more particularly shown in FIG. 9. The P-wave shown in FIG. 9 has four nodes.

If it be assumed that the dimensions of the ring 1 are such that the frequency of the X-wave of FIG. 8 is equal to the frequency of the P-wave of FIG. 9, there will be a large cross-coupling between the two waves, that is dependent upon angular velocity about the Z-axis. To explain this, consider a particle of the ring which is near the Y-axis. Under the influence of X-wave, this particle will move sinusoidally in a path parallel to the X-axis. If the ring 1, with its coordinate system, is rotated about the Z-axis, the particle's trajectory in inertial space is a series of curved arc segments. When a mass particle travels along a curved path, however, there is necessarily a rotation to the force which produces the acceleration needed to produce the curvature. This reaction is the before-mentioned Coriolis force.

For particle motions parallel to the X-axis and for rotation of the ring 1 about the Z-axis, these reaction Coriolis forces are parallel to the Y-axis. Thus, for particles near the Y-axis diameter, such as particles $1a$ and $1b$ in FIG. 9, the Coriolis forces are in a direction such that they either add energy to or subtract energy from the P-wave, since the motions of these particles induced by the P-wave are in radial directions, as before mentioned, and radial directions for these particle locations are substantially parallel to the Y-directed Coriolis forces. On the other hand, for particles far away from the Y-axis diameter, such as particles $1d$ and $1c$ in FIG. 9, the Coriolis forces will have only small components tending to affect the energy of the P-wave, since the radial motions of these particles induced by the P-wave are in directions substantially anti-parallel to the Y-directed Coriolis forces. If the number of wave lengths of the X-wave around the ring is equal to, or differs by more than one from, the number of wave lengths of the P-wave, then there is no net tendency for the Coriolis forces to cross-couple the two waves since the energy introduced into the P-wave by Coriolis forces acting on particles like $1a$ of FIG. 9 will be cancelled by Coriolis forces acting on particles like $1b$. However, analysis shows that, if the number of wave lengths of the X-wave around the ring is one more or one less than the number of wave lengths of the P-wave, there exists a net tendency for the Coriolis forces to add energy to or subtract energy from that component of the P-wave which is in time phase with the X-wave. Thus, there occurs a cross-coupling effect between the X-wave and the P-wave which is a function of the angular velocity of the ring 1. Although an X-driving wave and P-sensing wave have been discussed, the waves may be reversed with similar operation, if desired.

To recapitulate, an X-wave is defined as one that causes the elements of ring 1 to move in a direction perpendicular to its plane as shown in FIG. 8. A P-wave is defined as one that causes the elements of ring 1 to move in a radial direction as shown in FIG. 9. When the number of wave lengths of the X-wave differs by one and only one from the number of wave lengths around the ring of the P-wave, Coriolis forces associated with particle motions set up by one of the waves and angular motion of the ring as a whole can cause energy to be coupled into the other wave. This cross-coupling effect can be used to measure angular motion of the ring by driving one wave and sensing the other. Either the X-wave or the P-wave may be driven. If the X-wave is driven the P-wave is sensed and vice versa.

It should therefore be evident that the media 1 of the present invention must be specially shaped to support elastic-wave modes in different (orthogonal) directions and of common frequency. Stated otherwise, the moment of inertia of the medium cross-section must have specified values around the two axes of flexure for the elastic waves and different values for other axes. A circular cross-section rod will not support two such distinct and separate common-frequency waves, but a square or regular polygonic-shaped bar will do so. An appropriate rectangular bar, however, will support two different-frequencied waves along orthogonal directions.

Figure 10:
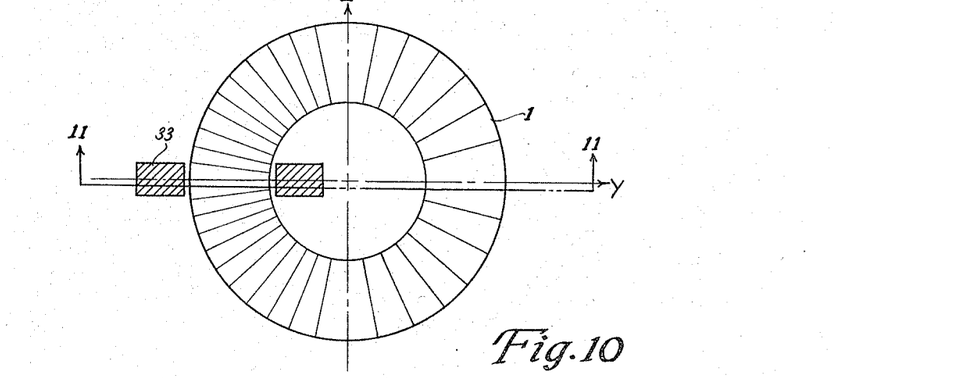
FIG. 10 is a top elevation of a ring with lines drawn radially thereof to illustrate schematically the presence of an extensional elastic wave in the ring.
Figure 11:
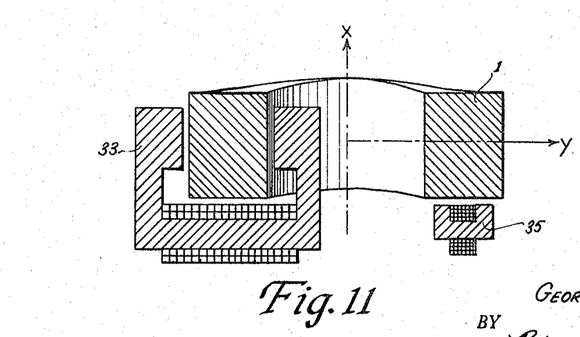
FIG. 11 is a transverse section taken upon the line 11—11 of FIG. 10, looking in the direction of the arrows, and indicating the X-wave elastic-vibration displacement.

In the embodiment of FIG. 10, a tangential, extensional driving wave (termed a $\varphi$-wave) and a flexural X-wave for sensing are employed. The radial lines across the ring illustrate the $\varphi$-wave deformation. The driving $\varphi$-wave may be induced in the case of a magnetizable ring 1, by the magnet driving device 33, more particularly illustrated in FIGS. 10 and 11. The ring 1 may be of steel alloy with driving energy supplied by an oscillator, including the driving coil 33, operating upon the magnetostriction principle. The sensing of the resulting X-wave, the amplitude of which is a measure of the angular motion of the transducer about the Z-axis, may be effected by a magnetic reluctance pick-up member 35, FIG. 11, disposed at a node of the extensional wave, as shown. One or more driving or pick-up units may also be employed. Where the medium 1 is not of ferromagnetic material, other types of pick-up devices, including the before-mentioned capacitive type, may also be employed.

Experimental rings of low carbon steel have been successfully operated with natural driving frequencies ranging from 1,200 to 12,000 cycles per second. Electromagnetic reluctance-type drivers 33 and pick-ups 35 were used. The maximum strains associated with the X-wave were of the order of $7 \times 10^{-4}$.

These tests have demonstrated conclusively that the general concept of the invention residing in supporting two separate and distinct waves in a single medium is feasible; and that even with relatively poor materials, Q's of the order of 1,000 can be obtained in both the driving and sensing modes. An angular rate sensitivity of the order of 2 volts per radian per second can be obtained at the sensing wave pick-up 35, even without the benefit of amplification.

In order to combat excessive unwanted cross-coupling resulting from other static or dynamic causes than the angular velocity-induced cross-coupling, a procedure of cross-coupling cancellation was developed. This technique consisted of notching the ring, as shown at 2 in FIG. 7, but for reasons of avoiding confusion, is not shown in the other figures, though it may be incorporated therein. The notching 2 was accomplished by filing the ring at the zero- and 180-degree locations, both top and bottom, as shown. The effect of notching is to produce an asymmetry in the elastic medium in a region of high strain. This asymmetry results in the production of bending moment components capable of putting energy into the X-wave. These moments effectively subtract from the influence of other strain-induced cross-coupling forces.

Double or further modulation effects may be produced through, for example, rotation or oscillation of the transducer in order, further, to reduce the unwanted cross-coupling effects and to separate the driving and sensing frequencies. In effect, this causes the nodes of the driving waves, such as the X-wave, instead of remaining stationary, to travel at a predetermined velocity or frequency; i.e. modulating the driving wave. Double modulation will later be discussed in connection with the embodiment of FIG. 14, but reference is made to the coordinate system of FIG. 12. Rotation of a transducer about the X-axis can be used to sense angular motions about two perpendicular axes. The sensing frequency will be different from the driving frequency due to a double modulation introduced by rotation or oscillation.

Figure 12:
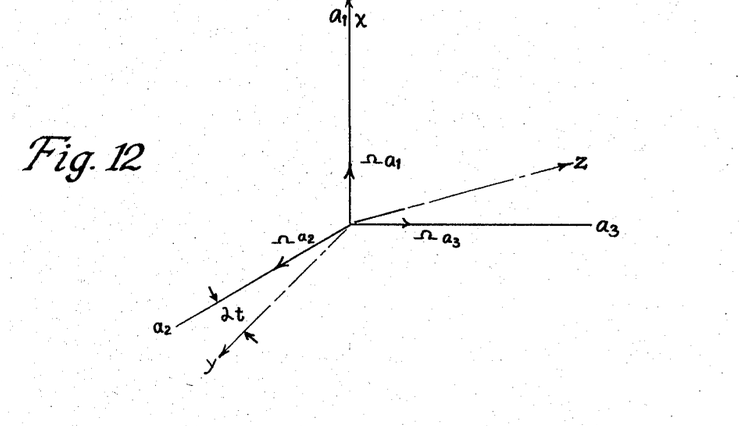
FIG. 12 is a coordinate diagram illustrating the various velocities associated with rotation of the ring transducer embodiment of the invention.

In FIG. 12, the angular velocities $\Omega_1$, $\Omega_2$, $\Omega_3$ of the apparatus along the three apparatus axes $a_1$, $a_2$, and $a_3$, are shown with the angle $\alpha t$ representing the angle between $a_2$-axis and the Y-axis. Although the wave-supporting medium is primarily sensitive to angular velocity about its Z-axis, it may be shown that the transducer becomes sensitive to angular velocities about two axes $a_2$ and $a_3$, as a result of rotation about the X-axis. As later discussed, moreover, such double or further modulation effects are also of similar utility in the before-mentioned prior-art macroscopically vibrating tuning forks and other systems.

Figure 13:
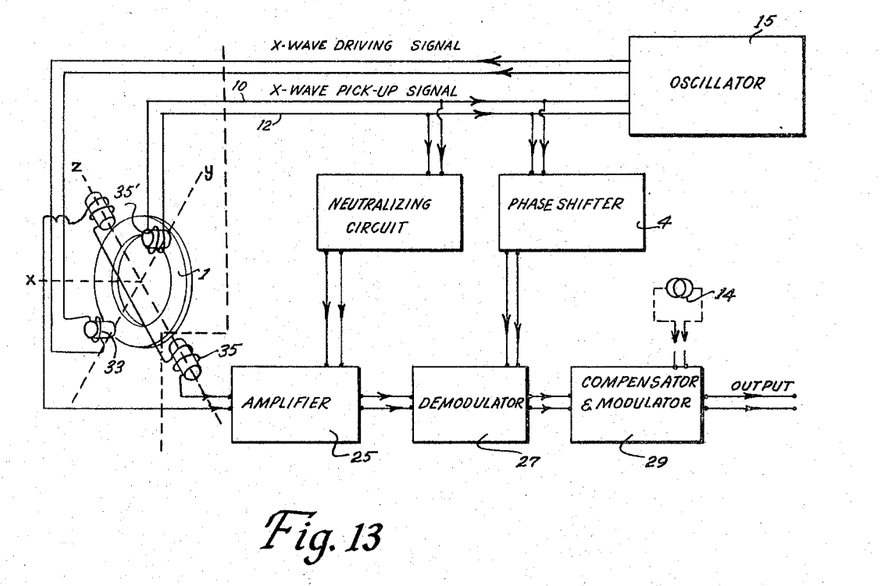
FIG. 13 is a block diagram together with a perspective diagram of the before-mentioned ring transducer embodied in a rate-measuring instrument.

An illustration of the application of the invention to serve as a substitute for a rate gyroscope is illustrated in FIG. 13. The function of the device is to convert an angular rate, with respect to inertial space, about a single apparatus axis into an electrical signal, which is closely proportional to said rate. This function is useful in control systems for torpedoes, aircraft, missiles, ships, and submarines, and the like. The ring 1 is driven by an amplitude-regulated oscillator 15, feeding one or more drivers 33. An X-wave pick-up signal from pick-up 35', at a predetermined frequency is fed back along conductors 10, 12. The P-wave pick-up signal from pick-up 35 is amplified at 25 and is demodulated in the demodulator 27, using as a reference the X-wave pick-up signal fed back along conductors 10, 12, after modification by a phase-shift network 4. In order to reduce the effect of cross-coupling between the driving X-wave and the sensing P-wave that is not associated with the angular motion, a portion of the picked-up X-wave signal may be applied through a neutralizing circuit to the amplifier 25, thereby to neutralize the undesired cross-coupled signal. The demodulator 27 may be either of the sampling or averaging types. The demodulated signal is then passed through a compensating network 29 to reduce the dynamic lag of the instrument if this is excessive for the particular application. This compensating network may, for example, be in the form of a simple lead network. The compensated signal may be used directly as a measure of the angular rate of the sensor unit about its sensitive axis. Alternatively, it may be used to modulate a carrier signal of any specified frequency. Thus, if a 400-cycle carrier signal is desired, a 400-cycle reference signal is supplied to a modulator following the compensator, as indicated by the dotted generator 14.

Alternatively, the amplitude of the P-wave could be maintained at a fixed level by a driving amplifier coupled to suitable driving means. The driving amplifier would then receive a signal from the P-wave pick-up after passing through control means actuated by an error signal related to the difference between the actual and desired values of the P-wave amplitude. The presence of Coriolis forces tending to increase or decrease the P-wave amplitude would be detected by a change in amplifier signal level needed to maintain constant amplitude. Thus, the amplifier signal level would be a measure of angular rate.

Figure 14:
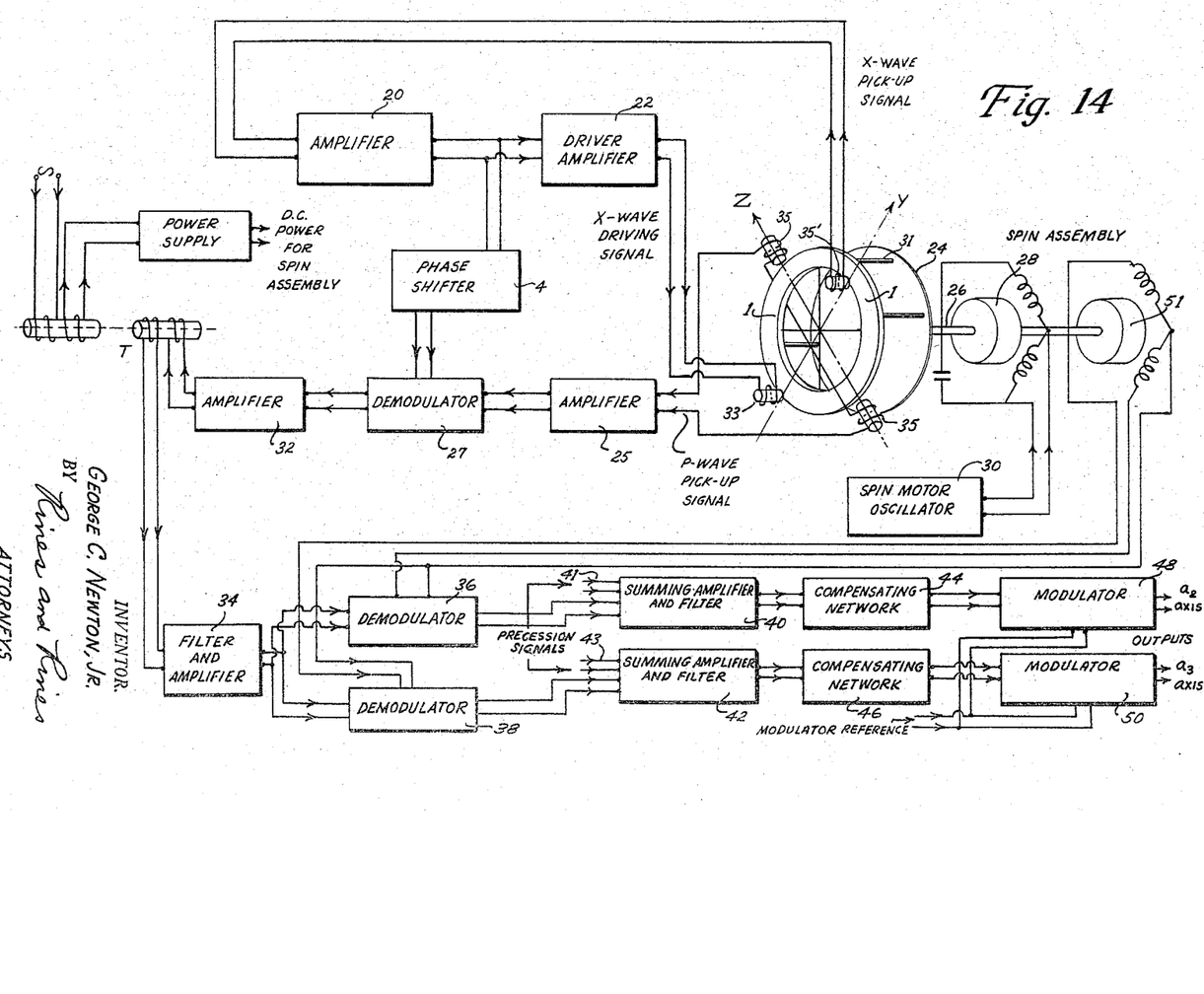
FIG. 14 is a similar diagram of an integrated rate-measuring instrument constructed in accordance with a preferred embodiment of the present invention.

In FIG. 14, a method of employing a ring transducer of the present invention in an integrated-rate-measuring instrument is illustrated. The upper part of this drawing shows the signal paths in the sensing unit. A standing X-wave is established in the ring by means of the oscillator circuit formed by the ring 1, the X-wave pick-up 35', the amplifier 20, the driver amplifier 32, and the X-wave driving magnet 33. These units form a feedback loop at the top of the figure. The resulting oscillator operates in the conventional manner; the X-wave signal is fed back positively with the gain adjusted to maintain the desired amplitude of oscillation. Automatic gain control may be provided in the driver amplifier in order to regulate the amplitude of oscillation.

The presence of a standing X-wave in the ring 1 will induce P-waves of three frequencies. The unwanted cross-coupling between the X- and P-modes will induce a P-wave whose frequency is the same as that of the X-wave. In addition, for constant angular velocity about either the $a_2$ or the $a_3$ apparatus axes, FIG. 12, Coriolis forces resulting from the combination of the X-wave motion and the angular velocity will cause P-waves of frequencies equal to the X-wave frequency plus the spin frequency and the X-wave frequency minus the spin frequency. The spin frequency corresponds to the angular velocity of the whole ring 1 assembly around the X-axis; the rotation around the X-axis is provided by the spin motor 28, which, in turn, is driven by a suitable frequency derived from the spin motor oscillator 30 or any other suitable source of alternating-current power. The ring 1 is shown carried by struts 31 upon a platform 24, rotated by a shaft 26 from the spin motor 28. The preferred form of the spin motor 28 is a hysteresis-type of synchronous motor, insuring that a rotation frequency is accurately determined by the frequency of the spin-motor oscillator 30.

If it is assumed that the ring 1 has been so adjusted that the P-wave natural frequency coincides with the X-wave frequency minus the spin frequency, there will be a strong P-wave response to the Coriolis forces corresponding to the lower sideband of the doubly modulated Coriolis force. With the relatively high Q's which are obtained in rings, it is possible to obtain considerable attenuation of the upper sideband and the X-wave frequency components of the P-wave response relative to what they would be if the P-wave natural frequency was adjusted for maximum response to these latter signal components. The P-wave response is converted to an electrical signal by means of the pick-ups. This signal is then amplified and passed into a demodulator which uses the X-wave frequency as its reference. The phase shifter Y in the reference channel is adjusted to obtain maximum response in the output of the demodulator 27. The frequency components in the output of the demodulator 27 will comprise a D.-C. term corresponding to the X-wave frequency induced in the P-mode of the ring, spin frequency corresponding to the P-wave responses induced by the Coriolis forces, and in addition, high frequency terms in the vicinity of twice the X-wave frequency. Of these terms the spin frequency term is of major interest.

The output of the demodulator 27 of the sensing unit is amplified in a further amplifier 32 and is passed to a transformer T used to couple from the rotating member to the outside frame, as indicated by dashed lines. By using transformers as rotary joints, slip rings are avoided. The output of the transformer T is fed to a filter and amplifier 34, to attenuate all but the spin frequency terms in the P-wave signal at this point. The method of processing the signal from this point on depends upon the application. Assume, as an example, that the overall objective of the transducer is to function as the sensitive element in a stable platform. The phase of the P-wave signal at the output of the filter and amplifier unit 34 is a function of the relative strength of the angular velocity about the $a_2$ and $a_3$ axes, FIG. 12. The signal is broken into components corresponding to these angular velocity components by means of demodulators 36 and 38 which receive reference signals from a two-phase permanent magnet alternator 51. By suitable phasing, the output of the demodulators 36, 38 can be made to be a measure of the angular velocities about the two apparatus axes. The signals coming out of the demodulators 36, 38 will then be unmodulated voltages plus ripple terms. Summing amplifiers 40, 42 may then be employed for the purpose of adding the precession signals, where required as indicated by the labeled input conductors 41, 43. The filters associated with the amplifiers 40, 42 may remove the beforementioned ripple. The precession signals are used to drive the stabilized platform at prescribed angular velocities. The signals are then passed through compensating networks 44, 46 and if required, further modulators 48, 50, to form the $a_2$ and $a_3$ axis outputs. The modulator reference corresponds to the frequency of the induction motors used as servos in the stabilized platform drive system, not shown. The output signals correspond to error signals for these drive servos.

The purpose of the compensating networks 44, 46 is to extend further the range of frequencies for which the overall system acts as integrators of angular velocities, since the high Q of the P-mode of the ring tends to make it integrate only for high frequency components in the angular velocities. Such an extension of range is desirable in certain systems of stabilizing platforms.

Although the demodulators 36, 38, the summing amplifiers and filters 40, 42, and the compensating networks 44, 46 may be electrical devices, as illustrated in FIG. 14 for purposes of explanation, it is to be understood that, in certain applications, electromechanical or other equivalent means for performing part or all of the functions of such apparatus may, if desired, be employed. As an example, an integrator based on the induction watt-hour meter principle may be used to combine the demodulation and compensation functions. The benefits of cross-coupling reduction attained by the double modulation operation of FIG. 14, as before stated, moreover, can also be obtained with other kinds of vibrating systems, such as tuning forks and other prior-art devices, previously discussed, including, even, conventional rotating gyroscopes. In the case of rotation of the medium as a whole, as before explained, the nodes of driving-wave vibration will be caused to travel, thus separating the driving and sensing frequencies; whereas, in the more general case, the driving vibration is modulated to produce sensing at a frequency different from both the driving-wave and modulation frequencies.

While the above explanation of the operation of the integrated-rate-measuring instrument has been based on the assumption of constant angular velocities about the apparatus axes, it is a simple matter to extend the reasoning to situations where the angular velocities are varying with time.

Figure 15:
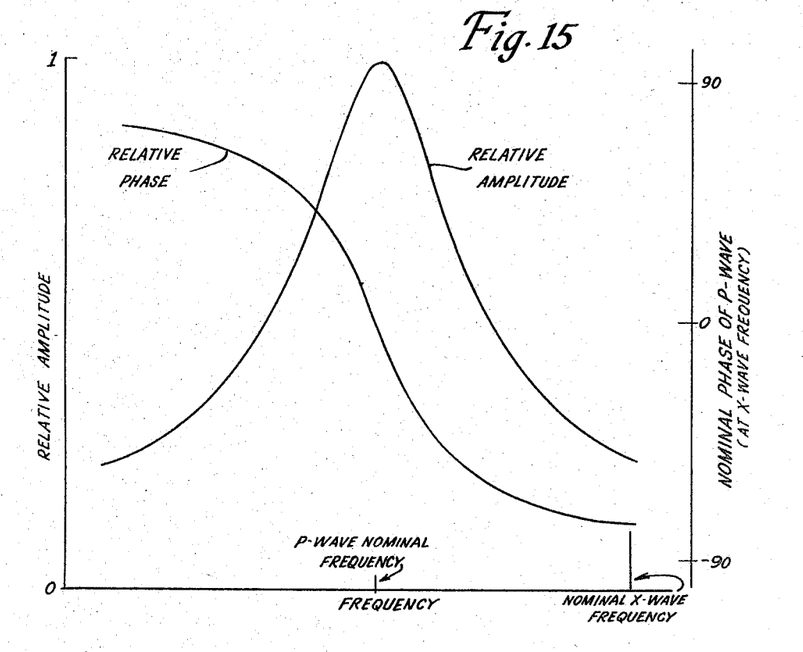
FIG. 15 is a graph illustrating the relationship between the phase of the elastic waves and the frequency thereof associated with the transducer.

FIG. 15 shows how the relative phase and amplitude of the P-wave response varies with forcing frequency. Relative amplitude is plotted along the left-hand ordinate, and relative phase, along the right-hand ordinate, with frequency plotted along the abscissa. At the X-wave frequency, corresponding to the unwanted cross-coupling, there is a nominal value of the phase of the P-wave response. Deviation of the response component of this frequency from normal can be used as a basis of automatic tuning for the P-wave frequency.

Figure 16:
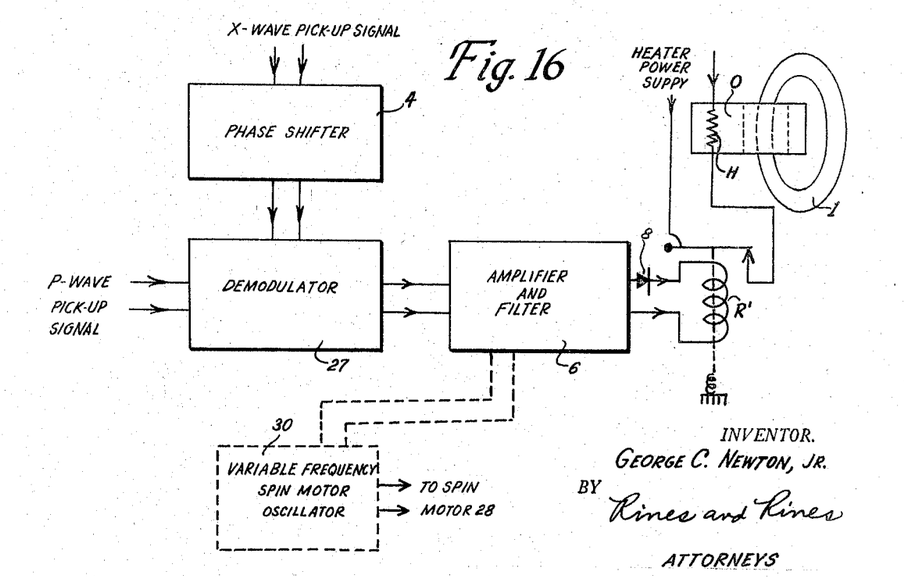
FIG. 16 is a block diagram of an apparatus for automatically tuning the before-mentioned P-type elastic wave frequency.

In FIG. 16, a technique is illustrated for automatically controlling the natural frequency of the P-wave in relation to that of the X-wave. This method uses the unwanted cross-coupling component of the P-wave. As before explained, this component has the same frequency as the X-wave. Thus, the procedure is to demodulate the signal derived from the P-wave using the X-wave as a reference. By suitable adjustment of the phase shifter 4, connected to receive the X-wave signal, it is possible to obtain zero output signal from the demodulator 27 when the phase of the P-wave response at X-wave frequency is at its nominally assigned value. With zero output, the signal supplied to the relay R' through the amplifier-and-filter 6, is zero. The relay R' is then open. With no heater power, an oven O remains cool and the natural frequency of the P-wave tends to increase in relation to the natural frequency of the X-wave. This causes the phase of the P-wave response at X-wave frequency to increase. Let it be assumed that polarities are so arranged that the demodulator output is positive for this condition. The amplifier-and-filter 6 then supplies power to the relay R' which closes and supplies power to the heater H in the oven O. The oven O then warms up and thereby causes the P-wave frequency to decrease relative to the X-wave natural frequency. In this manner, the natural frequency of the P-wave is maintained near the desired value. In order to prevent response of the relay R' to reverse currents which would flow if the phase of the P-wave response at X-wave frequency should become more negative than the nominally assigned value, and thereby cause the relay R' to close and further drive the P-wave natural frequency in the wrong direction, a rectifier 8 is inserted in the relay circuit.

An alternative technique for tuning the system resides in adjusting the spin frequency to a value equal to the sum or difference between the natural frequencies of the X- and P-waves. This tuning adjustment can be made automatic by providing means whereby the signal related to the phase deviation, above described, is used to control the frequency of the spin motor or oscillator 30 of FIG. 14. Connections for accomplishing this result are indicated in dotted lines in FIG. 16. For the polarities above assumed, for example, the frequency controlling means should decrease the spin frequency for a positive output signal from the demodulator 27 and increase the spin frequency for a negative output.

Further modifications will also occur to those skilled in the art and all such are considered to fall within the spirit and scope of the invention, as defined in the appended claims.

What is claimed is:

1. Transducer apparatus having, in combination, a ring-like medium adapted to support elastic waves, driving means for setting up elastic-wave displacements of elements of the medium having at least a component along a first direction, means for supporting the ring-like medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said ring-like medium further elastic-wave displacements having at least a component along the third direction, and sensing means positioned with respect to the said ring-like medium to detect the further elastic-wave displacements therein.

2. Transducer apparatus having, in combination, a ring-like medium adapted to support elastic waves, driving means for setting up elastic-wave displacements of elements of the medium having at least a component along a first direction, means for supporting the ring-like medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said ring-like medium further elastic-wave displacements having at least a component along the third direction, sensing means positioned with respect to the said ring-like medium to detect the further elastic-wave displacements therein, and means for diminishing cross-coupling between the first-named and further elastic-wave displacements except that associated with the rotational motion of the medium.

3. Transducer apparatus having, in combination, a ring-like medium adapted to support elastic waves, driving means for setting up elastic-wave displacements of elements of the medium having at least a component along a first direction, the medium being of a dimension comparable with or larger than the wave-length corresponding to the frequency of the elastic wave driving means, means for supporting the ring-like medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said ring-like medium further elastic-wave displacements having at least a component along the third direction, and sensing means positioned with respect to the ring-like medium to detect the further elastic-wave displacements therein.

4. Transducer apparatus having, in combination, a ring-like medium adapted to support elastic waves, driving means for setting up elastic-wave displacements of elements of the medium having at least a component along a first direction, the medium being of a dimension comparable with or larger than the wavelength corresponding to the frequency of the elastic wave driving means, means for supporting the ring-like medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said ring-like medium further elastic-wave displacements having at least a component along the third direction, sensing means positioned with respect to the said ring-like medium to detect the further elastic-wave displacements therein, and means for diminishing cross-coupling between the first-named and further elastic-wave displacements except that associated with the rotational motion of the medium.

5. Transducer apparatus as claimed in claim 1 and in which the driving means produces an X-type wave and the sensing means is positioned to detect a P-type wave.

6. Transducer apparatus as claimed in claim 1 and in which the ring-like medium is of dimension such that the number of wave lengths of the X-wave in the ring-like medium is different from the number of wave lengths of the P-wave.

7. Transducer apparatus as claimed in claim 1 and in which the driving means produces an X-type wave and the sensing means is adapted to detect a P-type wave of frequency different from the natural frequency of the X-type wave.

8. Transducer apparatus as claimed in claim 7 and in which means is provided for controlling the tuning of the P-type wave natural frequency at a predetermined value relative to the X-wave driving frequency.

9. Transducer apparatus as claimed in claim 8 and in which the frequency-controlling means comprises means for heating and cooling the ring-like medium, and there is provided means for sensing a component of the P-type wave having the same frequency at that of the X-type wave, means for comparing the phase of the said component and the phase of the X-type wave, and means responsive to differences in the frequencies of the said component and that of the X-type wave for controlling the heating and cooling means.

10. Transducer apparatus, having, in combination, a medium adapted to support elastic waves, driving means for setting up elastic-wave displacements of the elements of the medium having at least a component along a first direction, means for supporting the medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said medium further elastic-wave displacements having at least a component along the third direction, and sensing means positioned with respect to the said medium to detect the further elastic-wave displacements therein, at least one nodal point of the first named elastic-wave displacements being disposed near an antinodal point of the further elastic-wave displacements.

11. Transducer apparatus, having, in combination, a medium adapted to support elastic waves, driving means for setting up elastic-wave displacements of the elements of the medium having at least a component along a first direction, means for supporting the medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said medium further elastic-wave displacements having at least a component along the third direction, sensing means positioned with respect to the said medium to detect the further elastic-wave displacements therein, and means for diminishing cross-coupling between the first-named and further elastic-wave displacements except that associated with the rotational motion of the medium, the cross-coupling-diminishing means comprising means for rendering the medium asymmetric.

12. Transducer apparatus, having, in combination, a medium adapted to support elastic waves, driving means for setting up elastic-wave displacements of the elements of the medium having at least a component along a first direction, means for supporting the medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said medium further elastic-wave displacements having at least a component along the third direction, sensing means positioned with respect to the said medium to detect the further elastic-wave displacements therein, and means for diminishing cross-coupling between the first-named and further elastic-wave displacements except that associated with the rotational motion of the medium, the cross-coupling-diminishing means comprising means for rotating or oscillating the medium in a direction oriented to modulate the angular velocity along the said axis.

13. Transducer apparatus, having, in combination, a medium adapted to support elastic waves, driving means for setting up elastic-wave displacements of the elements of the medium having at least a component along a first direction, means for supporting the medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said medium further elastic-wave displacements having at least a component along the third direction, sensing means positioned with respect to the said medium to detect the further elastic-wave displacements therein, and means for diminishing cross-coupling between the first-named and further elastic-wave displacements except that associated with the rotational motion of the medium, the cross-coupling-diminishing means comprising notches in the medium disposed to produce asymmetry at a region of high strain.

14. Transducer apparatus, having, in combination, a medium adapted to support elastic waves, driving means for setting up elastic-wave displacements of the elements of the medium having at least a component along a first direction, means for supporting the medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said medium further elastic-wave displacements having at least a component along the third direction, and sensing means positioned with respect to the said medium to detect the further elastic wave displacements therein, the relative dimensions of the medium being such that the number of nodes of the driving and sensing elastic-wave displacements are different and the sensing means being positioned at a node of the driving elastic wave.

15. Transducer apparatus as claimed in claim 1 and in which the said elastic-wave displacements are of the X-type and P-type waves, and there is provided means for spinning the medium at a predetermined spin frequency about a direction oriented to modulate the angular velocity along the said axis, and means for varying the spin frequency to maintain the relative tuning of the P-type and X-type waves.

16. Transducer apparatus as claimed in claim 1 and in which the elastic-wave displacements are of the X-type and P-type waves, and there is provided means for controlling the temperature of the medium, thereby to control the P-type wave natural frequency.

17. Transducer apparatus having, in combination, a vibratory medium, driving means for vibrating the medium, means for supporting the medium to permit rotation of the same about a predetermined axis, means for repetitively moving the medium about the said axis, and sensing means for responding to a vibration frequency within the said medium different from that of the driving or moving frequencies and induced by Coriolis forces resulting from angular movement of the vibrating medium about a further axis disposed at an angle to the said predetermined axis.

18. Transducer apparatus as claimed in claim 17 in which the sensing means is tuned to respond to vibrations of frequency corresponding to the sum or difference of the driving and moving frequencies.

19. Transducer apparatus having, in combination, a vibratory medium, driving means for vibrating the medium, means for supporting the medium to permit rotation of the same about an axis extending substantially orthogonal to a path of vibration of the medium, means for repetitively moving the medium about the said axis, and sensing means for responding to a vibration frequency different from that of the driving or moving frequencies and induced by Coriolis forces resulting from angular movement of the vibrating medium about a further axis disposed at an angle to the first-named axis.

20. Transducer apparatus having, in combination, a vibratory medium, driving means for vibrating the medium, means for supporting the medium to permit rotation of the same about an axis extending substantially parallel to a path of vibration of the medium, means for repetitively moving the medium about the said axis, and sensing means for responding to a vibration frequency different from that of the driving or moving frequencies and induced by Coriolis forces resulting from angular movement of the vibrating medium about a further axis disposed at an angle to the first-named axis.

21. Transducer apparatus having, in combination, supporting means for the transducer apparatus, means for imparting velocity to an elemental portion of the transducer apparatus relative to the supporting means, means for permitting angular motion of the supporting means about an axis orthogonal to the direction of the said velocity in order to produce fluctuating Coriolis forces orthogonal to the said axis and said direction and having predetermined frequency components, means for repetitively moving the apparatus about an axis disposed at an angle to the said orthogonal axis to modify the said frequency components of the Coriolis forces, and sensing means for responding to at least one of the modified frequencies induced by the said Coriolis forces.

22. Transducer apparatus having, in combination, a medium adapted to support elastic waves, driving means for setting up elastic-wave displacements of elements of the medium having at least a component along a first direction, means for supporting the medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate further elastic-wave displacements having at least a component along the third direction, and sensing means positioned to detect the further elastic-wave displacements, the relative dimensions of the medium being such that the number of nodes of the driving and sensing elastic-wave displacements are different, and the said positioning of the sensing means being near a node of the driving elastic wave.

23. Transducer apparatus, having, in combination, a medium adapted to support elastic waves, driving means for setting up elastic-wave displacements of the elements of the medium having at least a component along a first direction, means for supporting the medium to permit rotation of the same about an axis extending along a second direction orthogonal to the first direction in order to produce Coriolis forces along a third direction orthogonal to the first and second directions resulting from the velocity of the element displacements along the first direction and the angular velocity about the said axis, thereby to generate in the said medium further elastic-wave displacements having at least a component along the third direction, sensing means positioned with respect to the said medium to detect the further elastic-wave displacements therein, and means for causing the nodes of the driving elastic-wave displacements to travel at a predetermined frequency, thereby to separate the frequencies of the driving and sensing elastic-wave displacements.

24. Transducer apparatus having, in combination, a vibratory medium, driving means for vibrating the medium at a first predetermined frequency, means for supporting the medium to permit rotation of the same about a predetermined axis, means for modulating the driving vibration of the medium at a second predetermined frequency in order to produce a resultant modulation vibration frequency different from each of the said predetermined frequencies, and sensing means for responding to the said resultant modulation vibration frequency induced by the rotation and vibrating of the medium and different from that of the driving or modulating frequencies.

References Cited by the Examiner

UNITED STATES PATENTS

| | | | |
|---|---|---|---|
| 2,343,738 | 3/1944 | Bechmann et al. | 310—8.2 |
| 2,466,018 | 4/1949 | Ferrill | 264—1 |
| 2,513,340 | 7/1950 | Lyman | 73—505 |
| 2,544,646 | 3/1951 | Barnaby et al. | 73—505 X |
| 2,552,650 | 5/1951 | Rawlings | 264—1 |
| 2,627,400 | 2/1953 | Lyman et al. | 264—1 |
| 2,683,247 | 7/1954 | Wiley | 264—1 |
| 2,725,492 | 11/1955 | Allan | 73—514 |
| 2,753,173 | 7/1956 | Barnaby et al. | 264—1 |

FOREIGN PATENTS

| | | |
|---|---|---|
| 1,176,197 | 11/1958 | France. |
| 611,011 | 10/1948 | Great Britain. |

RICHARD C. QUEISSER, *Primary Examiner.*

SAMUEL LEVINE, J. J. GILL, *Examiners.*